(12) United States Patent
Berry

(10) Patent No.: US 11,673,472 B2
(45) Date of Patent: Jun. 13, 2023

(54) APPARATUS AND METHOD FOR CONTROLLING A HIGH VOLTAGE CIRCUIT

(71) Applicant: JAGUAR LAND ROVER LIMITED, Coventry (GB)

(72) Inventor: Adrian Berry, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 343 days.

(21) Appl. No.: 16/461,302

(22) PCT Filed: Oct. 18, 2017

(86) PCT No.: PCT/EP2017/076570
§ 371 (c)(1),
(2) Date: May 15, 2019

(87) PCT Pub. No.: WO2018/108356
PCT Pub. Date: Jun. 21, 2018

(65) Prior Publication Data
US 2020/0062122 A1    Feb. 27, 2020

(30) Foreign Application Priority Data
Dec. 15, 2016 (GB) ...................... 1621367

(51) Int. Cl.
*B60L 3/00* (2019.01)
*G05D 1/00* (2006.01)
*B60L 50/60* (2019.01)

(52) U.S. Cl.
CPC ............. *B60L 3/003* (2013.01); *B60L 3/0023* (2013.01); *B60L 50/60* (2019.02); *G05D 1/0088* (2013.01);
(Continued)

(58) Field of Classification Search
None
See application file for complete search history.

(56) References Cited

U.S. PATENT DOCUMENTS 4,608,619 A    8/1986    Bomer et al.
5,654,888 A *  8/1997    Muller .................. B60T 8/885
                                                  701/54
(Continued)

FOREIGN PATENT DOCUMENTS

DE    102009029417 A1    3/2011
DE    112009000043 T5    4/2011
(Continued)

OTHER PUBLICATIONS

Khazaie, et al., Fault current limitation and contraction of voltage dips thanks to D-FACTS and FACTS cooperation, 2011 7th International Conference on Electrical and Electronics Engineering (ELECO) (Dec. 1, 2011).*

(Continued)

*Primary Examiner* — Jean Paul Cass
(74) *Attorney, Agent, or Firm* — McCoy Russell LLP

(57) ABSTRACT

Embodiments of the present invention provide a method of controlling a high-voltage circuit (15) of a vehicle, comprising detecting (310) a fault associated with the high-voltage circuit, reducing (320) a voltage of the high-voltage circuit (15) in dependence on detecting the fault, receiving (330) a torque request and, in dependence thereon, increasing (340) the voltage of the high-voltage circuit (15).

16 Claims, 2 Drawing Sheets

(52) U.S. Cl.
CPC ..... *B60L 2240/423* (2013.01); *B60L 2240/48* (2013.01)

(56) References Cited

U.S. PATENT DOCUMENTS

| | | | | |
|---|---|---|---|---|
| 6,009,366 | A * | 12/1999 | Burkhard | B60T 8/1764 701/79 |
| 6,102,492 | A * | 8/2000 | Diehle | B60T 8/1766 303/113.5 |
| 6,203,122 | B1 * | 3/2001 | Ehmer | B60T 8/885 303/113.5 |
| 6,256,570 | B1 * | 7/2001 | Weiberle | B60T 13/74 188/170 |
| 6,460,941 | B1 * | 10/2002 | Zenzen | B60T 8/1764 303/122 |
| 6,474,149 | B1 * | 11/2002 | Ehmer | B60T 17/22 73/121 |
| 6,507,198 | B1 * | 1/2003 | Streib | B60W 50/0205 123/396 |
| 6,816,810 | B2 * | 11/2004 | Henry | G08B 29/20 702/179 |
| 6,928,356 | B2 * | 8/2005 | Inoue | B60T 8/17636 701/79 |
| 7,047,121 | B2 * | 5/2006 | Inoue | B60T 8/17636 701/79 |
| 7,278,694 | B2 * | 10/2007 | Choi | B60T 8/17616 303/156 |
| 7,302,320 | B2 * | 11/2007 | Nasr | G06Q 10/08 701/22 |
| 7,328,092 | B2 * | 2/2008 | Eggert | B60W 30/1884 701/31.7 |
| 8,154,227 | B1 * | 4/2012 | Young | A63H 30/04 318/268 |
| 2001/0027537 | A1 * | 10/2001 | Nada | B60W 50/02 903/947 |
| 2003/0199362 | A1 * | 10/2003 | Chamberlin | B60T 7/042 482/8 |
| 2004/0020201 | A1 * | 2/2004 | Feigel | B60T 17/22 60/534 |
| 2005/0273231 | A1 * | 12/2005 | Sayce-Jones | B60T 8/1708 701/31.4 |
| 2006/0206241 | A1 * | 9/2006 | Minowa | G05B 19/00 701/1 |
| 2009/0242293 | A1 | 10/2009 | Tanaka et al. | |
| 2010/0033064 | A1 * | 2/2010 | Tanaka | G01P 3/48 310/67 R |
| 2012/0200152 | A1 * | 8/2012 | Schneider | B60L 50/16 307/9.1 |
| 2012/0298645 | A1 * | 11/2012 | Kleespiess | H01R 4/029 219/137 R |
| 2013/0076281 | A1 * | 3/2013 | Noguchi | H02P 6/16 318/400.04 |
| 2017/0074918 | A1 * | 3/2017 | Stewart | H02J 7/0029 |

FOREIGN PATENT DOCUMENTS

| | | |
|---|---|---|
| DE | 102011084006 A1 | 4/2013 |
| EP | 1603224 A1 | 12/2005 |
| EP | 1681197 A1 | 7/2006 |
| EP | 1858152 A1 | 11/2007 |
| EP | 1990910 A1 | 11/2008 |
| EP | 2641774 A1 * | 11/2010 |
| EP | 2641774 A1 | 9/2013 |
| JP | 2012135083 A | 7/2012 |

OTHER PUBLICATIONS

International Search Report and Written Opinion, PCT/EP2017/076570, dated Jun. 5, 2018.
Search and Examination Report, GB1621367.0, dated May 26, 2017.

* cited by examiner

APPARATUS AND METHOD FOR CONTROLLING A HIGH VOLTAGE CIRCUIT

CROSS-REFERENCE TO RELATED APPLICATIONS

This application is a 371 of International Application No. PCT/EP2017/076570, filed Oct. 18, 2017, which claims priority to GB Patent Application 1621367.0, filed Dec. 15, 2016, the contents of both of which are incorporated by reference herein in their entirety.

TECHNICAL FIELD

The present disclosure relates to a method and apparatus and particularly, but not exclusively, to a method and apparatus for controlling a high voltage circuit. Aspects of the invention relate to a method, to a controller, to a system, to a vehicle and to computer software.

BACKGROUND

High voltage (HV) circuits are often used in vehicles such as hybrid electric vehicles (HEVs) and Battery-Electric Vehicles (BEVs) to communicate power with HV components such as electric machines. The HV circuit may operate at a voltage of, or above, 60 Vdc or 30 Vac. For safety reasons, it is required to be able to isolate such HV circuits in the event of a fault, particularly to prevent a risk of electric shock or electrocution to occupants of the vehicle or bystanders, such as pedestrians. The risk of electric shock may occur in the event of a fault, such as if the HV circuit becomes open circuit. Vehicle may comprise functionality to detect the open circuit, such as a Hazardous Voltage Interlock Loop (HVIL) or by measuring voltages at various points in the HV circuit. Upon detection of a fault, a controller usually instructs shutdown of the HV circuit, which may be performed immediately or, if the vehicle is moving, may be performed as soon as the vehicle comes to a standstill.

However, once powered-down, the HV circuit is not available to operate the vehicle. For a BEV the electric machine(s) powered by the HV circuit are not operable to provide motive force to the vehicle. For a HEV the electric machine(s) powered by the HV circuit may also impede movement of the vehicle as they may be required to, for example, engage a clutch of the vehicle. Furthermore, in some vehicles, a low voltage circuit of the vehicle may be powered from the HV circuit, such as by means of a DCDC convertor. Therefore, even for such vehicles, it is necessary to have the HV circuit operable for continued use of the vehicle.

It is an object of embodiments of the invention to at least mitigate one or more of the problems of the prior art.

SUMMARY OF THE INVENTION

Aspects and embodiments of the invention provide a method, a controller, a system, a vehicle and computer software as claimed in the appended claims.

According to an aspect of the invention, there is provided a method of controlling a high-voltage circuit of a vehicle, comprising, when the high-voltage circuit is discharged in response to a fault being detected, increasing the voltage of the high-voltage circuit in response to receiving a torque request. Advantageously the vehicle is able to respond to the torque request.

According to an aspect of the invention, there is provided a method of controlling a high-voltage circuit of a vehicle, comprising, when the high-voltage circuit is discharged in response to a fault being detected, increasing the voltage of the high-voltage circuit in response to receiving a signal indicative of the vehicle being instructed to pull away. Advantageously the vehicle is able to pull away even though the fault has been detected.

According to an aspect of the invention, there is provided a method of controlling a high-voltage circuit of a vehicle, comprising detecting a fault associated with the high-voltage circuit, reducing a voltage of the high-voltage circuit in dependence on detecting the fault, and receiving a torque request and, in dependence thereon, increasing the voltage of the high-voltage circuit.

In an embodiment, the method comprises an increase in the voltage of the high-voltage circuit whilst the fault is present. Advantageously the voltage is increased to render a device attached to the high-voltage circuit operable. The voltage of the high-voltage circuit may be reduced from the operating voltage of the high-voltage circuit. Advantageously the high-voltage circuit is made safe by the reduction in voltage. Optionally, the operating voltage may be at least 50V. The voltage of the high-voltage circuit may be reduced to a safety voltage. Advantageously the safety voltage is such that the fault is not problematic. Optionally, the safety voltage may substantially be 0V. Advantageously, this reduces a hazard associated with the high-voltage circuit.

The torque request may be a request for propulsion torque for the vehicle. Advantageously the increase in voltage allows torque to be provided, which may allow movement of the vehicle. The torque request may originate from either a driver of the vehicle or an autonomous driving module of the vehicle. Advantageously, the driver or autonomous driving module may request the provision of torque, which may provide movement of the vehicle.

The fault detected may be an open-circuit fault. Advantageously the voltage may be increased even in the presence of the open circuit.

In an embodiment, the method comprises reducing the voltage of the high-voltage circuit subsequent to the torque request in dependence on detecting that the vehicle is stationary. Advantageously the voltage of the high-voltage circuit is again reduced after provision of torque. The voltage may be advantageously reduced again when the vehicle is moved to a safe location.

The voltage of the high-voltage circuit may be increased in dependence on the torque request and one or more predetermined conditions being satisfied. Advantageously when said conditions are satisfied it may be deemed safe to increase the voltage.

The predetermined conditions may comprise one or both of a brake of the vehicle being released and an attempt, successful or otherwise, at moving a transmission of the vehicle into a motive gear. Advantageously, the voltage of the high-voltage circuit may be increased, even in situations where the transmission cannot engage a gear.

According to another aspect of the invention, there is provided a high-voltage controller, comprising input means for receiving a fault signal indicative of a fault associated with the high-voltage circuit, output means for outputting a voltage control signal for controlling a voltage of the high-voltage circuit and input means for receiving a torque request signal indicative of a torque request. An aspect of the invention comprises a control means for receiving the fault signal and controlling the output means to output the voltage control signal for causing a reduction in the voltage of the high-voltage circuit. The control means is arranged to receive the torque request signal and to control the output means to output the voltage control signal for causing an increase in the voltage of the high-voltage circuit.

A controller as described above, wherein:
the input means may be an input arranged to receive an electrical signal;
the output means may be an output arranged to output an electrical signal; and
the control means may be a controller. The controller may be one or more processing devices.

In an embodiment, the control means is arranged to output the voltage control signal to restore the high-voltage circuit to an operating voltage in dependence on the torque request signal. The control means may be arranged to increase the voltage of the high-voltage circuit whilst the fault signal is received. Advantageously, this prevents any delay in increasing the voltage.

The control means may be arranged to output the voltage control signal for causing the reduction in the voltage of the high-voltage circuit from an operating voltage of the high-voltage circuit.

Optionally, the controller may reduce the voltage of the high-voltage circuit to a safety voltage. The safety voltage may be equal to or less than 12V. The safety voltage may be substantially 0V.

In an embodiment, the control means is arranged to determine that the vehicle is stationary and to reduce the voltage of the high-voltage circuit subsequent to the torque request in dependence thereon.

The control means may be arranged to increase the voltage of the high-voltage circuit in dependence on receiving the torque request and a signal indicative of one or more predetermined conditions being satisfied. The one or more predetermined conditions may comprise one or both of a brake of the vehicle being released and an attempt, successful or otherwise, at moving a transmission of the vehicle into a motive gear.

According to a further aspect of the invention, there is provided a high-voltage system for a vehicle, comprising a high-voltage circuit electrically connected to a high-voltage source, a high-voltage controller as previously specified and a high-voltage discharge controller, arranged to receive the voltage control signal and to control the voltage of the high-voltage circuit in dependence thereon.

According to a still further aspect of the invention, there is provided a vehicle arranged to perform a method, comprising an apparatus or comprising a system according to an aspect of the invention.

According to yet another aspect of the invention, there is provided computer software which, when executed by a computer, is arranged to perform a method according to an aspect of the invention. This computer software may be stored on a computer readable medium. The computer software may be tangibly stored on the computer readable medium. The computer readable medium may be non-transitory.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
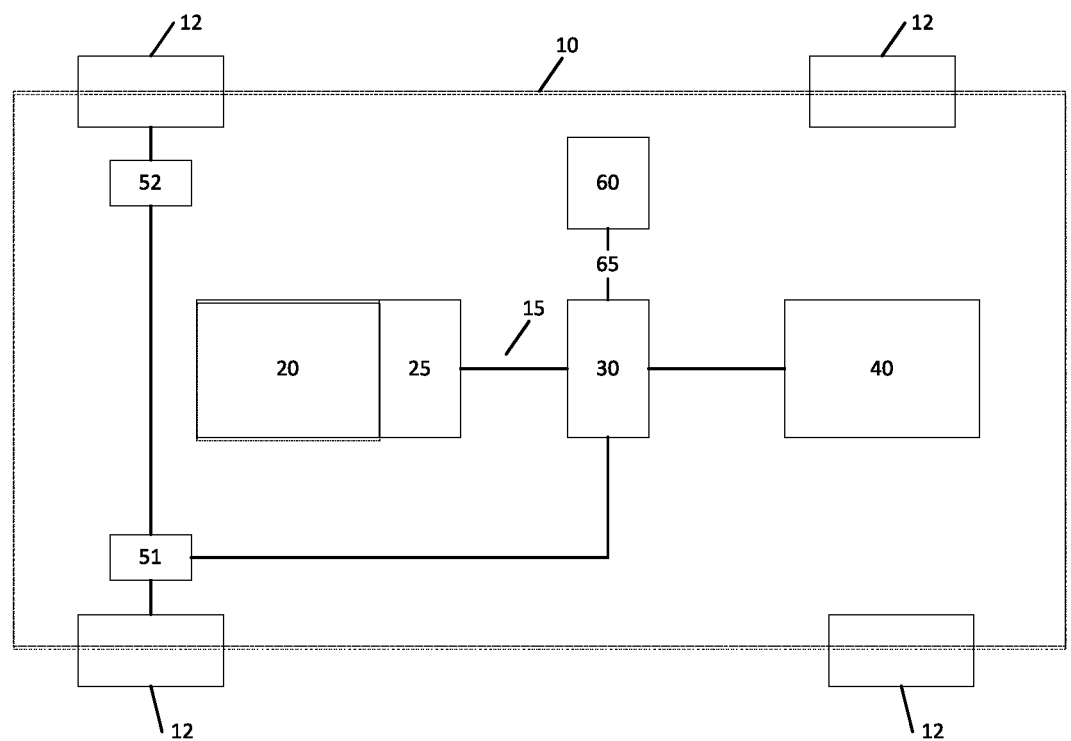
FIG. 1 shows a schematic illustration of a vehicle according to an embodiment of the invention.

FIG. 1 illustrates an electric vehicle (EV) 10 according to an embodiment of the invention. The vehicle 10 illustrated in FIG. 1 is a Hybrid Electric Vehicle (HEV). Whilst one form of EV is shown in FIG. 1 it will be realised that this is an example. Embodiments of the invention may be applied to any form of EV having a high voltage electrical circuit. Other forms of EV may be known a Plug-In Hybrid Electric Vehicle (PHEV), Battery Electric Vehicle (BEV) and fuel cell electric vehicle, although this list is not limiting.

The EV 10 illustrated in FIG. 1 comprises a High Voltage (HV) electrical circuit 15. The HV circuit 15 has an operating voltage which may be at least 60 Vdc or 30 Vac. In some embodiments, the HV circuit 15 has an operating voltage in excess of 100 Vdc, such as 300 Vdc although this is merely an example.

The HV circuit 15 comprises a HV battery means 40 for storing electrical energy therein and a HV control means 30 for controlling the HV circuit 15. The HV control means 30 may be a HV controller 30. The HV controller 30 may comprise one or more processing devices. The one or more processing devices may, in use, execute computer instructions in the form of computer software. HV controller 30 may comprise memory means which may comprise one or more electronic memory devices communicably coupled to the one or more processing devices. The memory device(s) may store the computer software operably executed the processing device(s) and may store data temporarily during execution of the computer software, as will be appreciated. The HV controller 30 may comprise an input means which is, in one embodiment, an input arranged to receive electrical signals representative of data. The input may communicate data with a communication bus of the vehicle 10. The HV controller 30 may comprise an output means which is, in one embodiment, an output arranged to output electrical signals representative of data. The output may communicate data with the communication bus of the vehicle 10 and may be integrated with the input as an 10 port of the HV controller 30.

In the embodiment of EV illustrated in FIG. 1, the vehicle 10 comprises an internal combustion (IC) engine 20. In some embodiments the IC engine 20 is coupled to an electric generator means in the form of an electric machine 25 operative as a generator for generating electrical energy to charge the battery means 40. The vehicle 10 is a wheeled vehicle having a plurality of wheels 12 which may be driven, in some embodiments, by both the IC engine 20 and one or more electric machines 51, 52 operative as electric motors 51, 52 coupled to at least some of the wheels 12 and operative as motors to drive the wheels 12. In other embodiments, the IC engine 20 may not be used to provide motive torque and may solely power the electric machine 25 to generate electrical energy. Embodiments of the invention are not limited in this respect and also encompass BEVs which do not comprise the IC engine 20 or electric machine 25, as will be appreciated.

The electric motors 51, 52 are electrically coupled to the HV circuit 15 to provide electrical energy thereto. The vehicle comprises fault detection means 60 for detecting a fault associated with the HV circuit 15. The fault detection means 60 may comprise a fault detection unit 60. The fault detection unit 60 may comprise one or more electrical inputs for each receiving an electrical signal. The electrical signal provided to each input may be indicative of a voltage at a respective location in the HV circuit 15. The voltage at each location may be measured by a voltage measurement device (not shown). Based on the one or more voltages, the fault detection unit 60 is arranged to determine whether a fault exists with the HV circuit 15. In particular, although not exclusively, an open circuit (OC) fault may be determined by the fault detection unit 60. The OC fault may be detected based on at least one voltage within the HV circuit 15. The OC fault may correspond to the measured voltage being an OC voltage of the HV circuit i.e. not indicative of a current being drawn from the HV circuit 15, such as by the electric motors 51, 52. It will be appreciated that faults with the HV circuit 15 may be detected in a variety of ways and that embodiments of the invention are not limited in this respect.

The fault detection means 60 is arranged to provide a fault signal 65 to the HV controller 30 indicative of a fault associated with the HV circuit 15. Since the HV circuit 15 carries a relatively high voltage, the circuit controller 30 is arranged to shut-down the HV circuit 15 in dependence on the fault signal 65. The HV circuit 15 may be shut-down immediately or, if the vehicle 10 is moving, the shut-down may be performed as soon as the vehicle 10 comes to a standstill i.e. its speed reaches 0. Shutting down the HV circuit 15 comprises discharging or reducing the voltage of the HV circuit 15. The discharging may comprise the HV controller 30 providing a signal to a discharge device or circuit to discharge the HV circuit 15, as will be appreciated and further described below. The signal may be provided via an electrical output of the HV controller 30. The HV circuit 15 is discharged such that, for example, human contact with the HV circuit 15 is not dangerous. However, once discharged, the functionality of the vehicle 10 is reduced. For example, the HV circuit 15 is not able to provide electrical energy, at least at a sufficient voltage, to power the electric motors 51, 52. Thus the vehicle 10 may become stranded. In some vehicles other functionality of the vehicle may be reduced, such as an ability to select a gear, which also leads to the vehicle being stranded by the reduction in HV voltage.

It has been appreciated that contact with the HV circuit 15 is only possible when the vehicle is stationary. For example, when access is gained to at least a portion of the HV circuit 15, such as via a bonnet, or other access door or hatch of the vehicle 10, being opened to allow the contact. That is, in a normal configuration of the vehicle 10, the HV circuit 15 is not accessible by either occupants of the vehicle 10 or persons outside the vehicle. Any exposed portions of the HV circuit 15 are insulated to prevent contact. Therefore it has been appreciated that it may be possible to allow operation of the HV circuit 15 under certain circumstances even in the presence of a fault.

Figure 2:
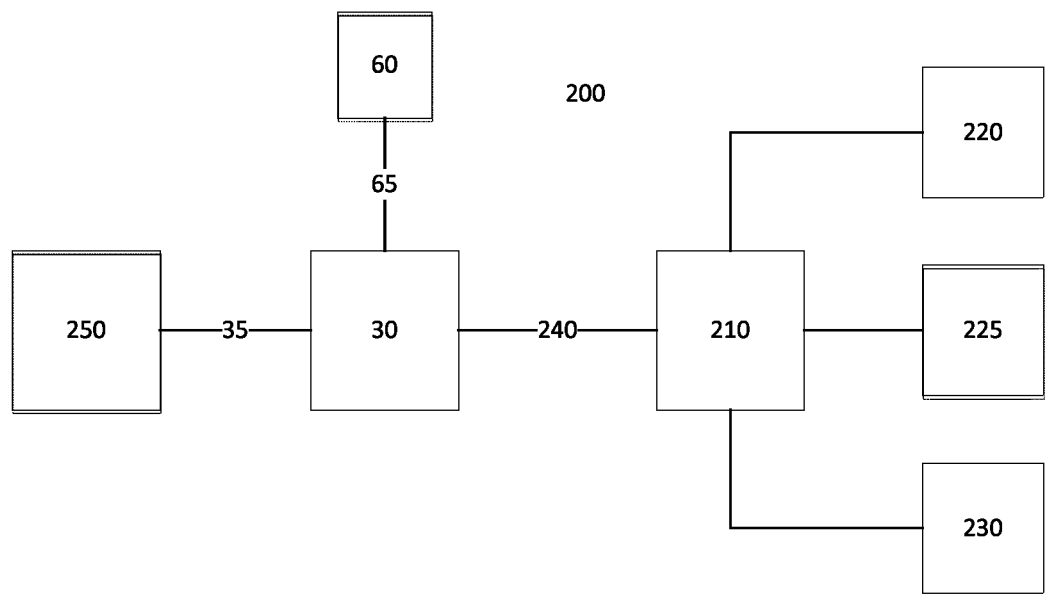
FIG. 2 shows a schematic illustration of a high voltage bus control system according to an embodiment of the invention.

FIG. 2 illustrates a high voltage bus control system 200 according to an embodiment of the invention. The HV bus control system 200 comprises the HV controller 30 described above, a HV discharge control means in the form of a HV discharge controller 250 operative to control the voltage of the HV circuit 15, and a torque control unit 210.

The HV discharge controller 250 is operative to control a voltage of the HV circuit 15. In particular, HV discharge controller 250 is operative to discharge the HV circuit 15 from an operating voltage thereof. The HV discharge controller 250 is operative in response a discharge signal 35 output from the HV controller 30 to discharge the HV circuit 15. When the HV circuit 15 is discharged its voltage may be reduced to a low voltage, such as 12 Vdc, or substantially to 0V. The HV discharge controller 250 may shunt the voltage of the HV circuit 15 to a ground of the HV circuit 15 in dependence on the discharge signal 35. The HV discharge controller 250 may be further operative in response to the discharge signal 35 to restore the HV circuit 15 to the operating voltage, which as noted above may be in excess of 60 Vdc or 30 Vac. The HV discharge controller 250 may restore the operating voltage of the HV circuit 15 by removing the shunt, thereby allowing the operating voltage the HV circuit 15 to rise.

The torque control unit 210 is operative to receive a request for motive or propulsion torque for the vehicle 10. In the embodiment illustrated in FIG. 2 the torque control unit 210 is arranged to receive a torque request signal indicative of a request for torque which may be provided from a sensor 220 associated with an accelerator pedal of the vehicle 10, wherein the sensor 220 is operative to determine the position of the accelerator pedal and output a signal indicative thereof to the torque control unit 210. In addition, in the embodiment illustrated in FIG. 2, the torque control unit 210 is arranged to receive a brake status signal indicative of a status of brakes of the vehicle 10, such as may be provided from a sensor 225 associated with a brake pedal of the vehicle 10. Furthermore, in some embodiments, the torque control unit 210 is arranged to determine a gear selection of the vehicle 10, in particular that a gear of the vehicle 10 is selected which will provide motion of the vehicle i.e. not park or neutral gears of the vehicle. The torque control unit 210 may be provided with a signal indicative of the selected gear from a sensor 230 associated with a gear selector of the vehicle 10 or from a module associated with an automatic gearbox of the vehicle indicative of the current gear. It will be appreciated that the torque control unit 210 may not be provided with signals from sensors as noted above, and that the torque control unit 210 may be provided with data indicative of the above-described attributes of the vehicle 10 from control modules associated with the respective controls, such as via a communications bus of the vehicle 10. Furthermore, a request for torque may not be generated responsive to a user-request in some embodiments. Instead the request for torque may be generated by an automatic or autonomous module such as an Advanced Driver Assistance System (ADAS) which may at least semi-autonomously control the vehicle 10. In some embodiments, the functionality of the torque request unit 210 to receive one or more of the signal indicative of a request for torque, the brake status signal and the signal indicative of the selected gear may be implemented in the HV controller 30, such as a software module thereof.

In one embodiment the toque control unit 210 is arranged to provide the HV controller 30 with a pull-away signal 240 indicative of a request for the vehicle 10 to pull away i.e. to begin movement from stationary. The pull-away signal 240 is output by the torque control unit 210 in response to one or more predetermined conditions. The predetermined conditions may be based on one or more of the request for torque, the brake status and the gear selection. In some embodiments, the pull-away signal 240 is output to the HV controller 30 when there is a request for torque, the brake status indicates the brakes of the vehicle 10 are released and that a forwards or reverse gear is selected i.e. the gear is not one of neutral or park in the case of an automatic transmission.

In response to receiving the pull-away signal 240, the HV controller 30 is arranged to increase the voltage of the HV circuit 15. The voltage of the HV circuit 15 is increased even in the presence of the fault. That is, the voltage of the HV circuit 15 is increased from the voltage at which it has previously been reduced to by the shut-down. The voltage of the HV circuit 15 may be increased to the normal operating voltage of the HV circuit 15. In some embodiments, whilst the fault detection unit 60 is providing the fault signal 65 to the HV controller 30, the HV controller 30 is operative to cause an increase in the voltage of the HV circuit 15 in dependence on receiving the pull-away signal 240. In one embodiment, the HV controller 30 modifies or ceases the discharge signal 35 provided to the HV discharge controller 250 such that the HV discharge controller 250 does not continue to discharge the HV circuit 15 i.e. in some embodiments the shunt to the HV ground is removed, thereby allowing the voltage of the HV circuit 15 to increase. Since it has been realised that the voltage of the HV circuit 15 may only pose a risk when the vehicle 10 is stationary, allowing the vehicle 10 to move, even in the presence of the fault, is not problematic. It has been realised that it is unlikely that the bonnet or access hatch of the vehicle will be open to allow access to the HV circuit 15 when the driver of the vehicle 10 intends the vehicle to move. Even in the case of a semi-autonomous or autonomous vehicle, a module providing the torque request will be configured not to provide the torque request if, for example, sensors indicate that persons are present close to the vehicle or, for example, the bonnet of the vehicle 10 is open. Furthermore, allowing the vehicle 10 to move may avoid the vehicle 10 being stranded.

Figure 3:
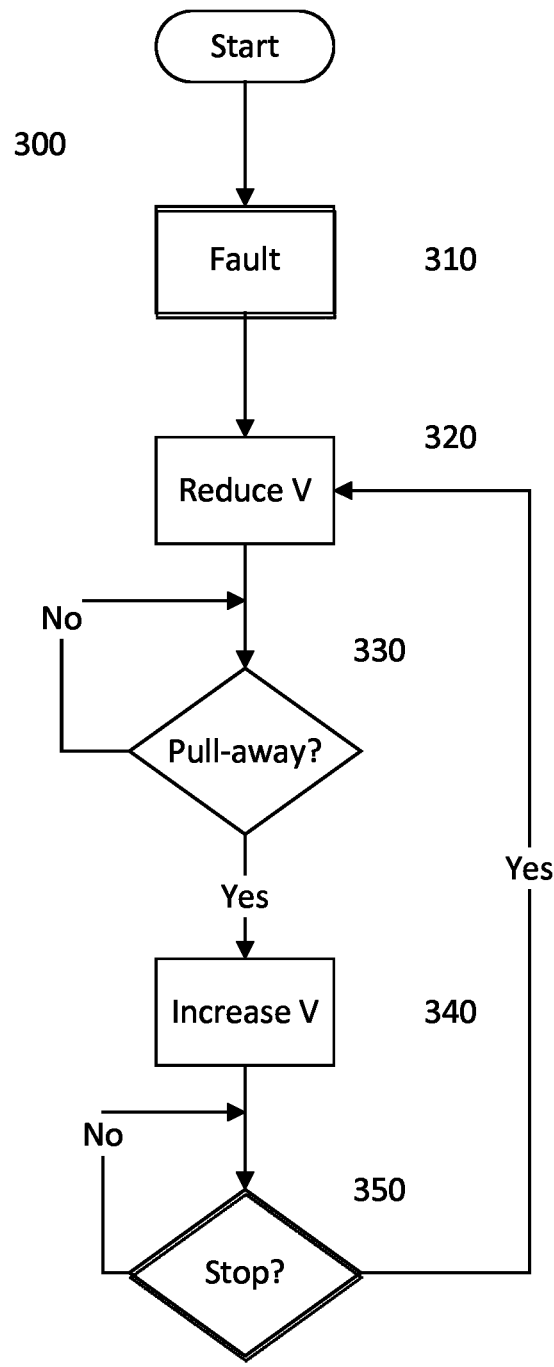
FIG. 3 shows a method according to an embodiment of the invention.

FIG. 3 illustrates a method 300 according to an embodiment of the invention. The method 300 is a method of controlling the HV circuit 15. The method 300 may be performed by the HV controller 30, as described above.

The method 300 comprises a step 310 of detecting a fault associated with the HV circuit 15. Step 310 may comprise the HV controller 30 receiving the fault signal 65. The fault signal 65 is indicative of the fault associated with the HV circuit 15. The fault signal 65 is indicative, in some embodiments, of an open circuit fault of the HV circuit 15.

In step 320 a voltage of the HV circuit 15 is reduced. The voltage is reduced in response to the detection of the fault in step 310. The voltage of the HV circuit 15 is reduced from the normal operating voltage of the HV circuit 15. The voltage of the HV circuit 15 may be reduced by the HV controller 30 being arranged to output the discharge signal 35 to discharge the HV circuit 15, wherein the HV discharge circuit 250 operates to discharge the HV circuit 15. The voltage of the HV circuit 15 may be reduced to a safety voltage, such as a low-voltage of, for example, 12 Volts. However in some embodiments the safety voltage is substantially 0V. Thus in step 320 the HV circuit 15 is reduced to a voltage which is not problematic for contact. Step 320 may be performed immediately upon step 310 occurring or, if the vehicle 10 is moving at the time of step 310, then step 320 may be performed as soon as the vehicle 10 comes to a standstill or stops.

In step 330 it is determined whether a torque request is received. The torque request is a request for propulsion or motive torque for the vehicle 10. The torque request may originate from the driver of the vehicle 10, from a driver-assistance module of the vehicle or from an autonomous driving module of the vehicle 10. The torque request may be determined in dependence on one or more conditions comprising the presence of the request for torque, the brake status indicating that the brakes of the vehicle 10 are released and that a forwards or reverse gear is selected i.e. the selected gear is not one of neutral or park in the case of an automatic transmission. Thus in step 330 it is determined whether it is intended, either from the driver or a module of the vehicle, for the vehicle 10 to pull-away. Step 330 may be performed by the HV controller 30 receiving the pull-away signal 240. If step 330 is determined to be affirmative, then the method 300 moves to step 340. If, however, the torque request is not received, then the method remains in step 330 i.e. the method 300 loops or does not progress. Whilst in step 330 the voltage of the HV circuit 15 is reduced.

In step 340 the voltage of the high-voltage circuit 15 is increased. The voltage of the HV circuit 15 is increased even whilst the fault is detected, as may be indicated by the continued existence of the fault signal 65. The voltage of the HV circuit 15 may be increased to the normal operating voltage of the HV circuit 15 in step 340. Step 340 allows one or more components or systems powered by the HV circuit 15, such as the motors 51, 52, to operate. Thus as a result of the torque request in step 330 the operating voltage of the HV circuit 15 is restored to allow motive force to be applied to the vehicle 10 by the motors 51, 52.

In step 350 it is determined whether the vehicle 10 has stopped. If the vehicle 10 stops then the method returns to step 320 wherein the voltage of the HV circuit 15 is reduced. That is, until the vehicle 10 comes to a stop the HV circuit 15 is controlled to remain at the operating voltage or high voltage, but once stopped the voltage of the HV circuit 15 is reduced to a safe voltage.

It will be appreciated that embodiments of the invention allow HV circuit dependent functionality to be provided subsequent to a fault being detected.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of controlling a high-voltage circuit of a vehicle, comprising:
   detecting a fault associated with the high-voltage circuit;
   reducing a voltage of the high-voltage circuit based on detecting the fault;
   while the fault is present, receiving a torque request for propulsion torque and, based on the torque request, increasing the voltage of the high-voltage circuit to restore the high-voltage circuit to an operating voltage while the fault remains present and delivering propulsion torque to propel the vehicle;
   subsequent to the torque request, determining that the vehicle is stationary; and
   responsive to the determination that the vehicle is stationary, and while the fault remains present, reducing the voltage of the high-voltage circuit to a safety voltage.

2. The method of claim 1, wherein the voltage of the high-voltage circuit is reduced from an operating voltage of the high-voltage circuit.

3. The method of claim 1, wherein the torque request is a request for propulsion torque for the vehicle.

4. The method of claim 1, wherein the torque request originates from a driver of the vehicle or an autonomous driving module of the vehicle.

5. The method of claim 1, wherein the fault is an open-circuit fault.

6. The method of claim 1, further comprising reducing the voltage of the high-voltage circuit subsequent to the torque request based on detecting that the vehicle is stationary.

7. The method of claim 1, further comprising increasing the voltage of the high-voltage circuit based on the torque request and one or more predetermined conditions being satisfied.

8. The method of claim 7, wherein the one or more predetermined conditions comprise one or both of a brake of the vehicle being released and an attempt at placing a transmission of the vehicle into a motive gear.

9. A high-voltage controller for a vehicle, comprising:
   an input for receiving a fault signal indicative of a fault associated with a high-voltage circuit;
   an output for outputting a voltage control signal for controlling a voltage of the high-voltage circuit;
   an input for receiving a torque request signal indicative of a torque request;
   a controller for receiving the fault signal and, based on the fault signal, to control the output to output the voltage control signal for causing a reduction in the voltage of the high-voltage circuit,
   wherein the controller is arranged to receive the torque request signal for propulsion torque while the fault is present and, based on the torque request signal, to control the output to output the voltage control signal for causing an increase in the voltage of the high-voltage circuit to restore the high-voltage circuit to an operating voltage while the fault remains present and delivering propulsion torque to propel the vehicle,
   wherein the controller is arranged, subsequent to receiving the torque request signal, to determine that the vehicle is stationary, and
   further wherein the controller is arranged, responsive to the determination that the vehicle is stationary, and while the fault remains present, to reduce the voltage of the high-voltage circuit to a safety voltage.

10. The high-voltage controller of claim 9, wherein the controller is arranged to output the voltage control signal for causing the reduction in the voltage of the high-voltage circuit from an operating voltage of the high-voltage circuit.

11. The high-voltage controller of claim 9, wherein the controller is arranged to increase the voltage of the high-voltage circuit based on the torque request and receiving a signal indicative of one or more predetermined conditions being satisfied.

12. The high-voltage controller of claim 11, wherein the one or more predetermined conditions comprise one or both of a brake of the vehicle being released and an attempt at moving a transmission of the vehicle into a motive gear.

13. A high-voltage system for a vehicle, comprising:
   a high voltage circuit electrically connected to a high-voltage source;
   the high-voltage controller of claim 9; and
   a high voltage discharge controller arranged to receive the voltage control signal and to control the voltage of the high voltage circuit based on the voltage control signal.

14. A vehicle comprising the high-voltage controller of claim 9.

15. Computer software which, when executed by a computer, is arranged to perform a method according to claim 1.

16. The computer software of claim 15 stored on a non-transitory computer readable medium.

* * * * *